United States Patent
Silversides et al.

(10) Patent No.: US 10,873,504 B1
(45) Date of Patent: Dec. 22, 2020

(54) MANAGING CONCURRENTLY RECEIVED CONFIGURATION REQUESTS IN A COMPUTING NETWORK

(71) Applicant: HEWLETT PACKARD ENTERPRISE DEVELOPMENT LP, Houston, TX (US)

(72) Inventors: Timothy Silversides, Dromore (GB); Jonathan Stewart, Belfast (GB); Jordan Snodgrass, Belfast (GB)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/514,556

(22) Filed: Jul. 17, 2019

(51) Int. Cl.
G06F 15/177 (2006.01)
H04L 12/24 (2006.01)

(52) U.S. Cl.
CPC ...... *H04L 41/0859* (2013.01); *H04L 41/0813* (2013.01)

(58) Field of Classification Search
CPC ............... H04L 41/085; H04L 41/0859; H04L 41/0813
See application file for complete search history.

(56) References Cited

U.S. PATENT DOCUMENTS 7,475,097 B2   1/2009  Kaler et al.
8,365,185 B2   1/2013  Bobak et al.
8,433,618 B2   4/2013  Marsh et al.
8,984,341 B1*  3/2015  Chandrasekharapuram ................ G06F 11/263
                                              714/32

(Continued)

OTHER PUBLICATIONS

Henning Sanneck et al., "Transaction-based Configuration Management for Mobile Networks," First Annual Workshop on Distributed Autonomous Network Management Systems, Jun. 2006, pp. 1-8.

(Continued)

*Primary Examiner* — Jonathan A Bui
(74) *Attorney, Agent, or Firm* — Jaffery Watson Mendonsa & Hamilton (57) ABSTRACT

Example implementations relate to managing concurrently received configuration requests in a computing network that includes a set of configurable network entities. IN an example, a plurality of configuration requests are received concurrently and a separate database transaction is opened in a configuration database for each received configuration request. A plurality of configuration deltas are identified, each of the plurality of configuration deltas representing a change in a configuration of a network entity of the computing network requested by one of the plurality of received configuration requests. An existing configuration of the network entity is obtained from the configuration database and the existing configuration of the network entity is modified using the identified configuration deltas to generate a provisioning request for the network entity. The provisioning request is issued to the network entity to implement the changes in the configuration of the network entity requested by the received configuration requests, and following successful completion of the provisioning request by the network entity, the database transaction for each received configuration request is committed.

20 Claims, 5 Drawing Sheets

(56) References Cited

U.S. PATENT DOCUMENTS

| | | | |
|---|---|---|---|
| 9,032,162 B1* | 5/2015 | Chang | G06F 13/161 |
| | | | 711/149 |
| 9,047,334 B1 | 6/2015 | Cheriton | |
| 9,430,544 B2* | 8/2016 | Li | G06F 16/27 |
| 9,647,891 B2* | 5/2017 | Croy | H04L 41/0893 |
| 10,009,225 B2* | 6/2018 | Mares | H04L 41/0813 |
| 10,089,316 B1* | 10/2018 | Haase | G06F 16/1727 |
| 10,374,886 B1* | 8/2019 | A | H04L 41/20 |
| 10,380,026 B2* | 8/2019 | Sundararaman | G06F 3/065 |
| 2006/0050862 A1 | 3/2006 | Shen et al. | |
| 2008/0285536 A1* | 11/2008 | Kaidar | H04L 67/32 |
| | | | 370/345 |
| 2012/0210391 A1 | 8/2012 | Raleigh | |
| 2015/0081618 A1* | 3/2015 | Schuster | G06F 16/254 |
| | | | 707/602 |
| 2015/0081908 A1 | 3/2015 | Tan et al. | |
| 2016/0020949 A1* | 1/2016 | Mares | H04L 41/0813 |
| | | | 709/221 |
| 2017/0280329 A1* | 9/2017 | Sun | H04W 16/14 |
| 2019/0158353 A1* | 5/2019 | Johnson | H04L 67/34 |
| 2019/0191004 A1* | 6/2019 | Nakagoe | H04L 67/12 |
| 2019/0311056 A1* | 10/2019 | Birke | G06F 16/24542 |
| 2020/0106814 A1* | 4/2020 | La Barrie | G06Q 10/10 |
| 2020/0118061 A1* | 4/2020 | Jain | G06Q 10/047 |

OTHER PUBLICATIONS

John Lawitzke, "Multi-vendor Network Provisioning and Openstack," Oct. 24, 2013, pp. 1-4 (online), Tail-f Systems, Retrieved from the Internet on Jun. 14, 2019 at URL: <tail-f.com/multi-vendor-network-provisioning-openstack/>.

Juniper Networks, "Committing a Configuration," Dec. 12, 2018, pp. 1-28 (online), Retrieved from the Internet on Jun. 14, 2019 at URL: <juniper.net/documentation/en_US/junos/topics/topic-map/junos-configuration-commit.html>.

* cited by examiner

MANAGING CONCURRENTLY RECEIVED CONFIGURATION REQUESTS IN A COMPUTING NETWORK

BACKGROUND

Modern computer network system architectures often include a management application which receives configuration requests via an application programming interface (API). The management application provisions external network entities in accordance with the received configuration requests. Clients of the API expect that their configuration requests will either succeed or fail completely, i.e. in the event of an error or failure in the provisioning process there will be no partial provisioning of an external entity. This "all or nothing" behaviour is managed through the use of configuration databases. Thus, when a configuration request is processed, a transaction is opened in a configuration database, state changes to an external entity requested by the configuration request are applied to the database in the context of the open transaction, and the transaction is committed only if the configuration request is successfully completed. If the configuration request fails then the transaction is reverted, such that the management application rolls back to the configuration that existed before the configuration request was received.

BRIEF DESCRIPTION OF THE DRAWINGS

The following detailed description references the drawings, wherein.

DETAILED DESCRIPTION

The use of database transactions in the manner described above can be effective for individually received configuration requests, but can be problematic when multiple configuration requests are received concurrently, as may occur, for example in a datacentre environment where a high degree of automation is used in provisioning external entities such as network entities. In this case, each concurrently received request is associated with a different database transaction, and so changes made in the context of one transaction and provisioned on an external entity may overwrite changes made in the context of another transaction. This problem can be mitigated by processing configuration requests in series, but such an approach can introduce significant delay in processing multiple configuration requests. Alternatively, the problem can be avoided by excluding provisioning operations from the scope of database transactions and instead performing provisioning as a background operation. However, this can lead to other issues, as successful completion of a configuration request does not provide any information to the requestor about the current provisioning state of an external entity (since completion of the provisioning operation is not linked to committing a database transaction), and failure of a provisioning operation will not trigger rollback of the application state, thus giving rise to a state mismatch between the management application and the external entity.

One example of the present disclosure is directed to a method for managing concurrent configuration requests in a computing network that includes a set of configurable network entities. A plurality of configuration requests are received concurrently and a separate database transaction is opened in a configuration database for each received configuration request. A plurality of configuration deltas are identified, each of the plurality of configuration deltas representing a change in a configuration of a network entity of the computing network requested by one of the plurality of received configuration requests. An existing configuration of the network entity is obtained from the configuration database and the existing configuration of the network entity is modified using the identified configuration deltas to generate a provisioning request for the network entity. The provisioning request is issued to the network entity to implement the changes in the configuration of the network entity requested by the received configuration requests. Following successful completion of the provisioning request by the network entity, the database transaction for each received configuration request is committed.

A further example of the present disclosure is directed to a system for managing concurrent configuration requests in a computing network that includes a set of configurable external entities. The system comprises a processor and a machine readable medium storing instructions. When executed, the instructions cause the processor to provide an application processing interface (API) to receive a plurality of configuration requests concurrently, identify a plurality of configuration deltas, each of the plurality of configuration deltas representing a change in a configuration of an external entity of the computing network requested by one of the plurality of received configuration requests, obtain an existing configuration of the external entity from the configuration database, modify the existing configuration of the external entity using the identified configuration deltas to generate a provisioning request for the network entity, and issue the provisioning request to the external entity to implement the changes in the configuration of the network entity requested by the received configuration requests.

A further example of the present disclosure is directed to a non-transitory computer readable storage medium having stored thereon instructions. When executed by a processing resource the instructions cause the processing resource to provide an application processing interface (API) to receive a plurality of configuration requests concurrently, open a separate database transaction in a configuration database for each received configuration request, identify a plurality of configuration deltas, each of the plurality of configuration deltas representing a change in a configuration of a network entity of the computing network requested by one of the plurality of received configuration requests, obtain an existing configuration of the network entity from the configuration database, modify the existing configuration of the network entity using the identified configuration deltas to generate a provisioning request for the network entity, issue the provisioning request to the network entity to implement the changes in the configuration of the network entity requested by the received configuration requests, and following successful completion of the provisioning request by the network entity, committing the database transaction for each received configuration request.

By virtue of examples of the present disclosure a mechanism for managing multiple concurrently received configuration requests efficiently is provided. In particular, examples of the present disclosure permit changes to the configuration of one or more external entities that have been requested in multiple different configuration requests to be provisioned on those external entities simultaneously, using "merged" provisioning requests. This approach can reduce latency in the handling of received configuration requests. Further, this approach may ensure that changes made in the context of one transaction cannot overwrite changes made in the context of another transaction, because transactions are not committed until successful completion of the generated provisioning request. Additionally, this approach may ensure that the current provisioning state of an external entity is accurately reflected in the configuration database. Examples of the present disclosure also maintain the ability to roll back to a previous configuration or state in the event of failure of the provisioning request.

Figure 1:
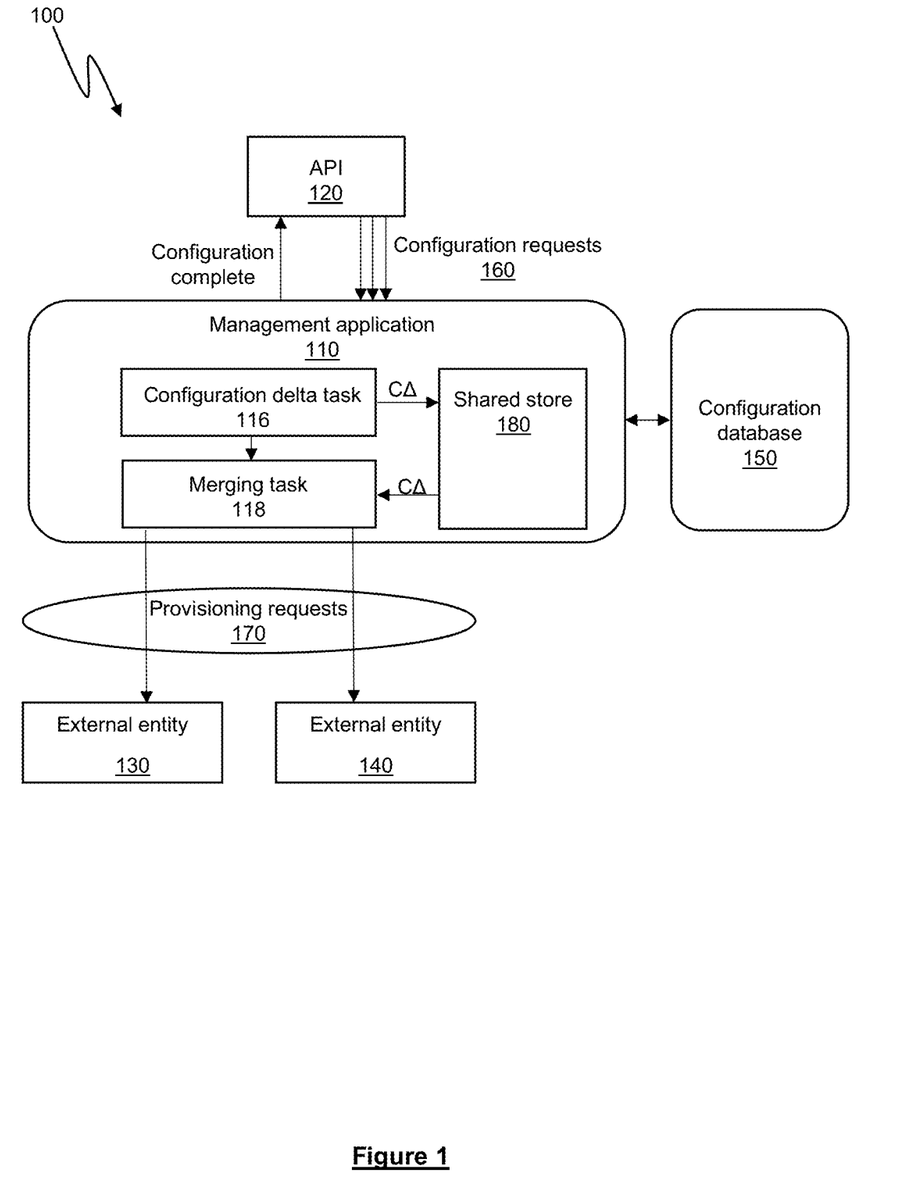
FIG. 1 is a schematic representation of a computing network system.

FIG. 1 is a schematic representation of a computing network system that provides an efficient mechanism for dealing with multiple concurrently received configuration requests, while maintaining the ability to roll back to a previous configuration on failure of the provisioning request. It is to be appreciated that in the context of the present disclosure the terms "concurrent", "concurrently" and derivative terms should not necessarily be interpreted as meaning that configuration requests are received at exactly the same time. Instead these term should be interpreted as referring to active configuration requests (i.e. configuration requests that have not been implemented) that are present at the same time. As will be appreciated by those skilled in the art, such "concurrent" active configuration requests need not have been received at the same time.

The computing network system, shown generally at 100 in FIG. 1, includes a management application 110 which may be, for example, a network controller application, the functionality of which (including configuration delta task 116 and merging task 118 described below) may be implemented, for example, as a software module comprising appropriate instructions (stored on a suitable machine readable storage medium such as a random access memory (RAM), read-only memory (ROM), CD, DVD or the like) for execution by one or more processors or processing resources. The computing network system 100 also includes an application programming interface (API) 120, associated with the management application 110, by means of which configuration requests can be received by the management application 110, and a set of configurable external entities 130, 140 which may be, for example, configurable network entities such as, for example, switches, compute nodes and storage controllers, external to the management application 110, which can be provisioned by the management application 110 using provisioning operations, as will be described in more detail below.

The computing network system 100 further includes a configuration database 150, which stores configuration information for the external entities 130, 140. As will be described in more detail below, when multiple configuration requests 160 are received by the management application 110, via the API 120, the management application 110 is operative to open a separate transaction in this configuration database 150 in order to record the requested changes to the configuration of the external entities 130. However, the requested changes are not committed (i.e. saved permanently and made visible to applications accessing the configuration database 150) in the opened database transactions until provisioning requests 170 corresponding to the requested changes to the configuration of the external entities 130, 140 have been issued to the external entities 130, 140 and successfully completed. This approach allows the management application 110 quickly and easily to roll back to a previous state or configuration in the event that the provisioning requests 170 are not successfully completed.

The management application 110 includes a configuration delta module or task 116, which is operative to identify or generate a plurality of configuration deltas, each of which represents a change in a configuration of one of the external entities of the computing network, the change being requested by one of the plurality of received configuration requests.

In order to identify the configuration deltas, the configuration delta module or task 116 is operative to compare the changes that are requested to the current configuration of an external entity 130, 140 by each received configuration request 160 to an existing configuration of that external entity 130, 140. For example, the configuration delta module or task 116 may parse each received configuration request 160 and compare the contents of each received configuration request to the existing configuration of the relevant external entity to generate the configuration deltas. The existing configuration may be, for example, a base or default configuration or a current configuration of the relevant external entity. As each received configuration request is associated with a separate transaction in the configuration database 150, a separate set of configuration deltas is generated for each database transaction, each set of configuration deltas being associated with a different received configuration request. The configuration deltas generated in this way are stored or retained in a shared store 180, from which they are accessible to the merging module or task 118 until the database transaction in which they were generated is either committed or reverted.

The management application 110 further includes a merging module or task 118, which is operative to generate a provisioning request based on the configuration deltas and to issue the provisioning request to an external entity.

To this end, the merging module or task 118 is operative to receive the configuration deltas from the configuration delta module or task 116 (or from the shared store of configuration deltas) and to retrieve, from the configuration database 150, an existing configuration (which may be, for example, a base or default configuration or a current configuration) for each external entity affected by the configuration changes requested by the received configuration requests. The merging module or task 118 determines capabilities of each affected external entity, such as the scope of provisioning requests supported by the external entity and the ability of the external entity to update multiple properties simultaneously. If the external entities are capable of supporting provisioning requests that implement configuration changes that are requested by multiple different configuration requests, and/or are capable of updating multiple port properties simultaneously, the merging module or task 118 modifies the retrieved configuration for each external entity using the contents of the received configuration deltas for that external entity to generate a "merged" provisioning request 170 for each external entity. Each such "merged" provisioning request provisions changes to the configuration of the relevant external entity that were requested in multiple different configuration requests. In order to generate a merged provisioning request, the configuration changes represented by the configuration deltas are applied to the existing configuration that has been retrieved from the configuration database, to determine what the final configuration of the external entity would be if all of the received configuration requests were provisioned in series. A single provisioning request is then generated by the merging module or task 118 implementing the determined final configuration. The generated provisioning requests will also include any configuration deltas that were previously provisioned for the external entities but have not yet been committed, to ensure that previously provisioned (but not yet committed) configurations are not overwritten. The generated provisioning requests are issued by the merging module or task 118 to the external entities to implement the changes in the configuration of the external entities requested by the received configuration requests. In this way, configuration changes requested by multiple concurrently received configuration requests may be merged into a single provisioning request to be issued to an external entity, thus improving the efficiency with which the external entity can be provisioned, as compared to serial processing of concurrently received configuration requests.

Once the provisioning requests 170 have been successfully completed by the relevant external entities, a notification of successful completion of the provisioning requests is issued by the management application 110. The management application 110 commits the database transactions associated with the provisioning requests, and configuration deltas generated for those database transactions are removed from the shared store. In the event that a provisioning request is not successfully completed, the associated database transactions are rolled back such that the relevant database entries and the management application 110 revert to the state that existed prior to the database transaction being opened, to ensure that the configuration database 150 and the management application 110 reflect accurately the current configuration of external entities. The configuration deltas generated for those database transactions are also removed from the shared store to ensure that they cannot be applied to the external entities inadvertently.

It is to be appreciated that the management application 110, configuration delta module or task 116 and merging module or task 118 may be implemented, for example, as software modules comprising appropriate instructions (stored on a suitable machine readable storage medium such as a random access memory (RAM), read-only memory (ROM), CD, DVD or the like) for execution by one or more processors or processing resources to perform the functionality described herein.

Figure 2:
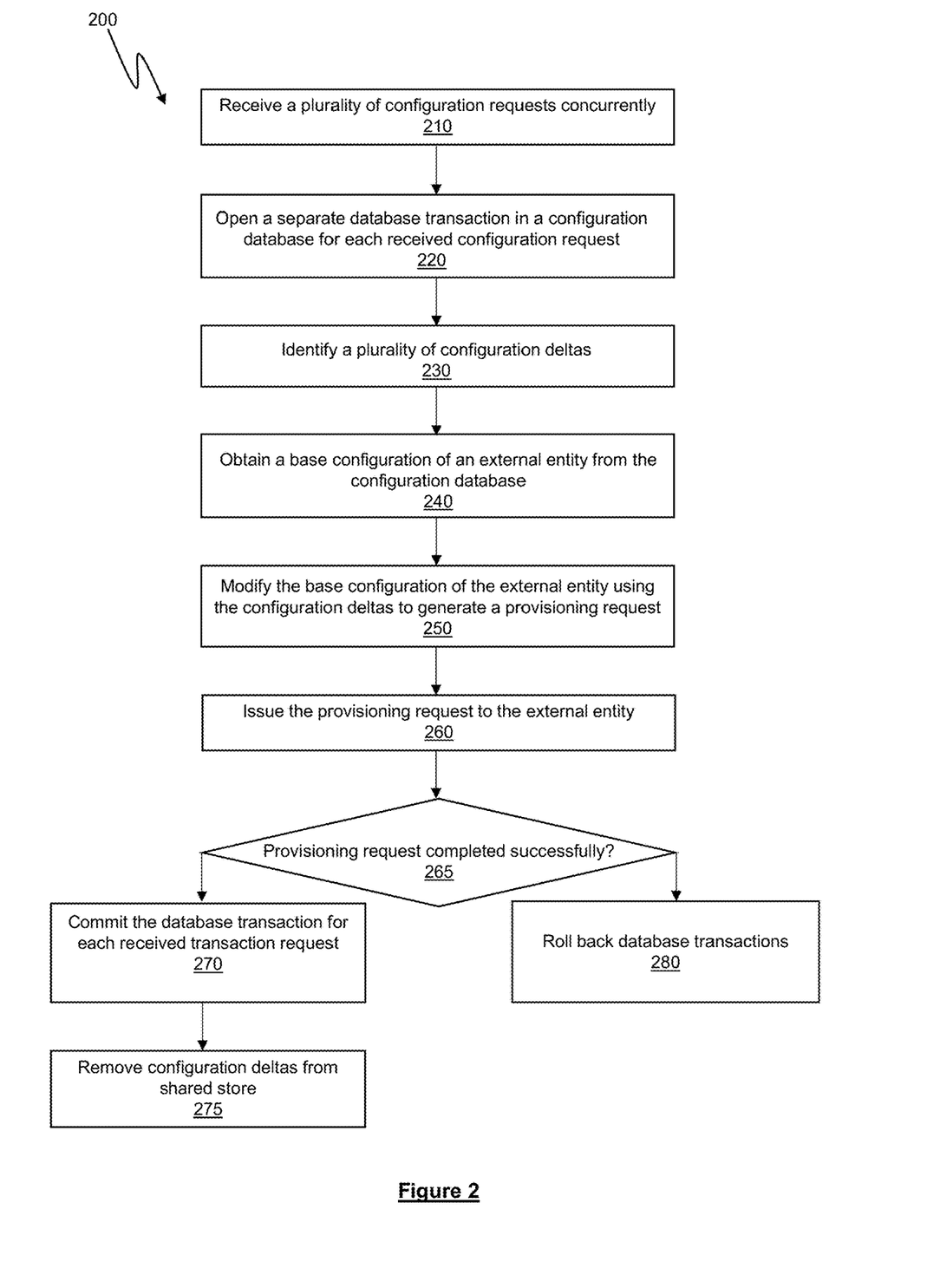
FIG. 2 illustrates a method for managing concurrently received configuration requests in a computing network.

Turning now to FIG. 2, a method for managing concurrently received configuration requests in a computing network is shown generally at 200. At step 210 a plurality of configuration requests are received concurrently at a management application (e.g. the management application 110 of FIG. 1). Each configuration request includes details of a required configuration of one or more external entities, e.g. network entities such as switches, compute nodes or storage controllers, of a network controlled by the management application.

At step 220 a separate database transaction is opened in a configuration database (e.g. the configuration database 150 of FIG. 1) for each received configuration request.

At step 230 a plurality of configuration deltas are identified by a configuration delta task or module such as the configuration delta task or module 116 executing in the management application 110 of FIG. 1. Each configuration delta represents a change in a configuration of one of the external entities of the computing network requested by one of the plurality of received configuration requests. The configuration deltas are stored or retained in a shared store, from which they are accessible until the database transaction in which they were generated is either committed or reverted.

At step 240 an existing configuration (e.g. a base or default configuration or a current configuration) of an external entity is retrieved from the configuration database by a merging task or module (e.g. the merging task or module 118 of FIG. 1). At step 250 the retrieved configuration of the external entity is modified (by the merging task or module) using the configuration deltas identified in step 230 so as to generate a provisioning request for the external entity that may contain or implement configuration changes requested by some or all of the received plurality of configuration requests. The generated provisioning request for the external entity may also contain or implement configuration changes corresponding to configuration deltas that were previously provisioned for the external entity but have not yet been committed. At step 260 the generated provisioning request is issued to the external entity (by the merging task or module).

At step 265 a determination is made as to whether the provisioning request has been completed successfully. On successful completion of the provisioning request by the external entity (as determined by this determination), a notification of successful completion of the provisioning request is issued and the database transactions for each received transaction request that is implemented in the issued provisioning request are committed at step 270, and the configuration deltas for the database transactions are removed from the shared store at step 275. If the provisioning request is not successfully completed, the database transactions for the corresponding transaction requests are rolled back (step 280), such that the configuration database 150 and the management application 110 revert to the state in which they existed prior to opening the relevant database transactions. Additionally, at step 285 the configuration deltas for the database transactions are removed from the shared store to ensure that they cannot be applied to the external entity inadvertently.

Figure 3:
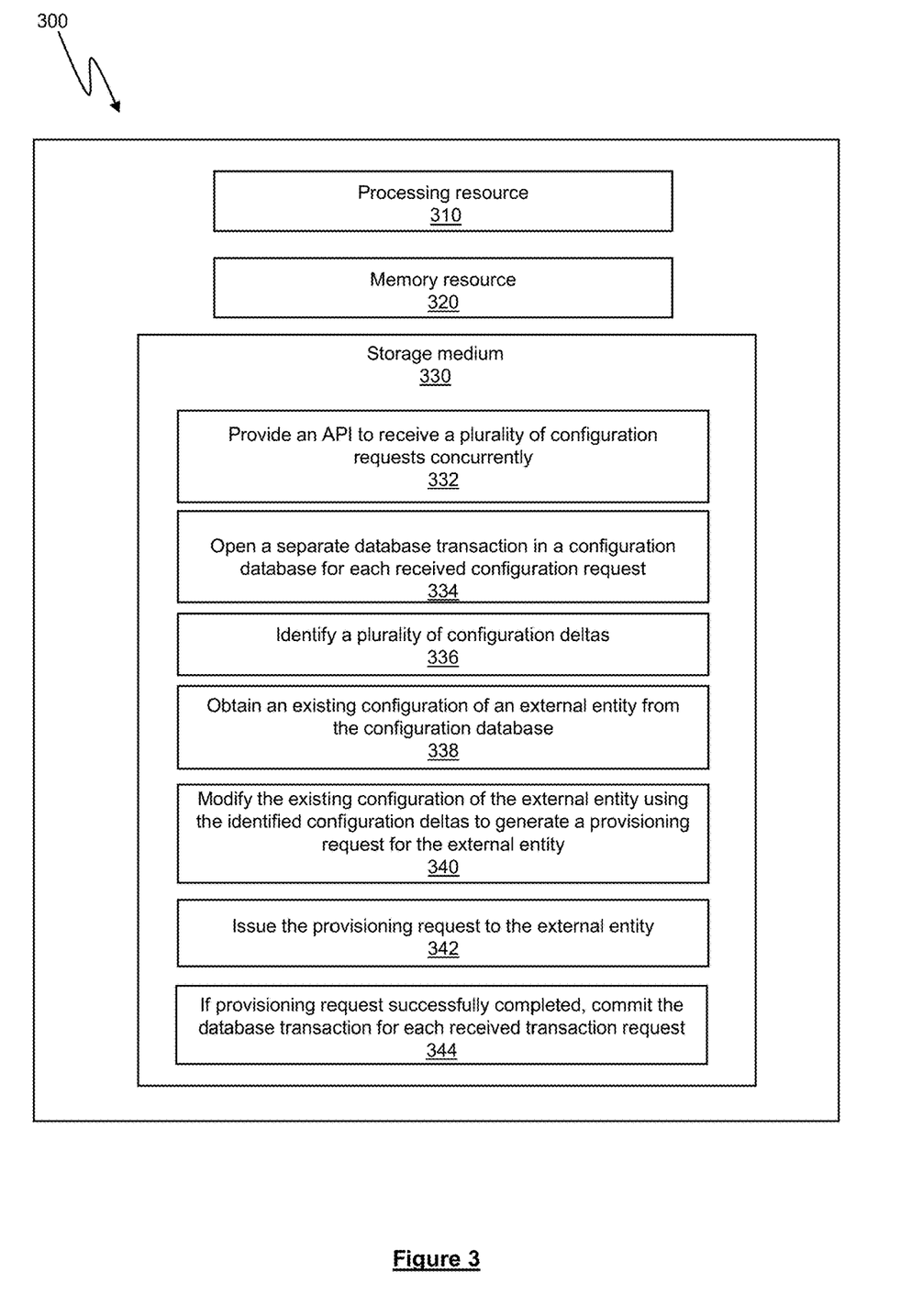
FIG. 3 illustrates a computing system including a processing resource, a memory resource and a storage medium storing instructions for execution by the processing resource.

FIG. 3 is a schematic representation of a computing system for managing multiple concurrently received configuration requests. As shown in FIG. 3, the computing system 300 include a processing resource 310, a memory resource 320 and a machine readable storage medium 330, which may be non-transitory (i.e. does not encompass transitory propagating signals) and may include, for example, a random access memory (RAM), read-only memory (ROM), CD, DVD or the like, storing instructions for execution by the processing resource 310.

The instructions include instructions 332 to cause the processing resource 310 to provide an API to receive a plurality of configuration requests concurrently. The instructions further include instructions 334 to cause the processing resource 310 to open a separate database transaction in a configuration database (e.g. the configuration database 150 of FIG. 1) for each received configuration request, in the manner described above.

The instructions include instructions 336 to cause the processing resource 310 to identify a plurality of configuration deltas in the manner described above. The instructions include instructions 338 cause the processing resource 310 to obtain an existing configuration of an external entity from the configuration database. The instructions include instructions 340 cause the processing resource 310 to modify the existing configuration (e.g. a base or default configuration or a current configuration) of the external entity using the identified configuration deltas to generate a provisioning request for the external entity, as described above. The instructions further include instructions 342 to cause the processing resource 310 to issue the provisioning request to the external entity, again as described above. The instructions further include instructions 344 to commit the database transaction for each received transaction request on successful completion of the provisioning request.

Figure 4:
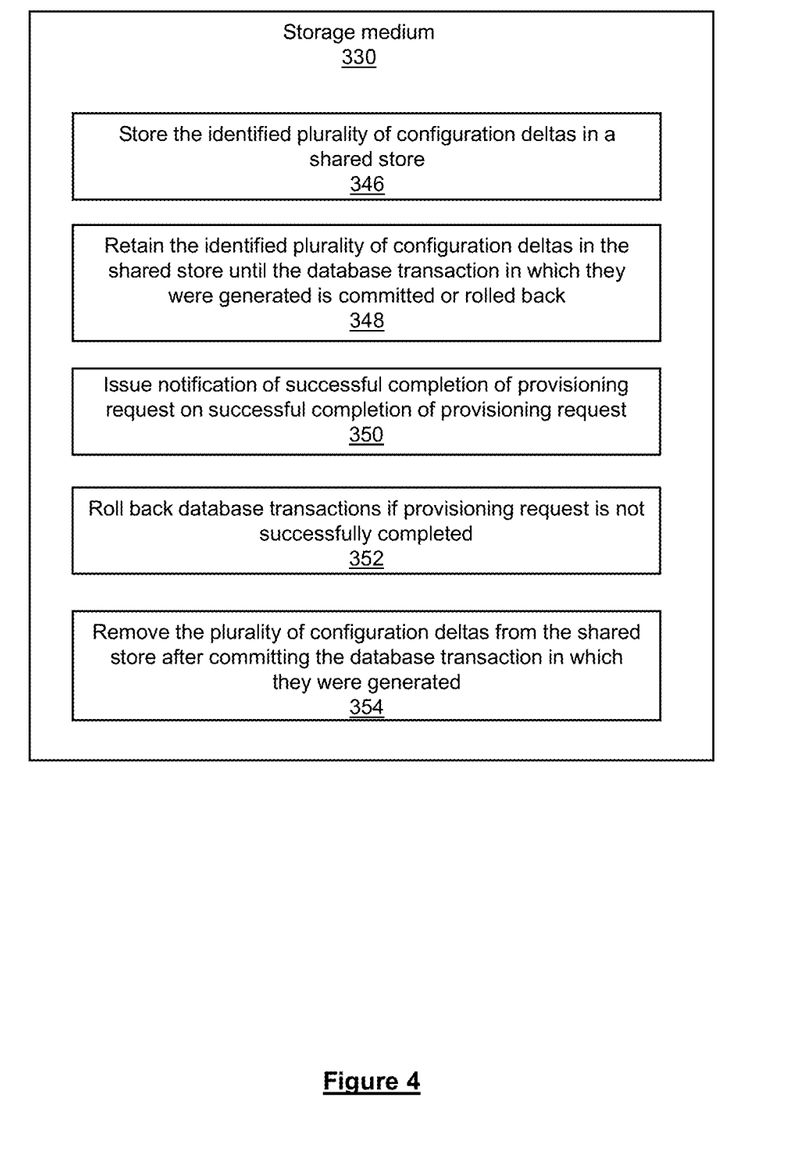
FIG. 4 illustrates additional instructions that may be stored in the storage medium.

As shown in FIG. 4, the instructions may further include instructions 346 to store the identified plurality of configuration deltas in a shared store (e.g. the shared store 180 shown in FIG. 1) and instructions 348 to retain the configuration deltas in the shared store until the database transaction in which they were generated is either committed or rolled back. The instructions may further include instructions 350 to issue a notification of successful completion of the provisioning request on successful completion of the provisioning request. The instructions may further include instructions 352 to roll back the database transactions in the event that the provisioning request is not successfully completed. The instructions may further include instructions 354 to remove the configuration deltas generated in a database transaction from the shared store after committing that database transaction.

Figure 5:
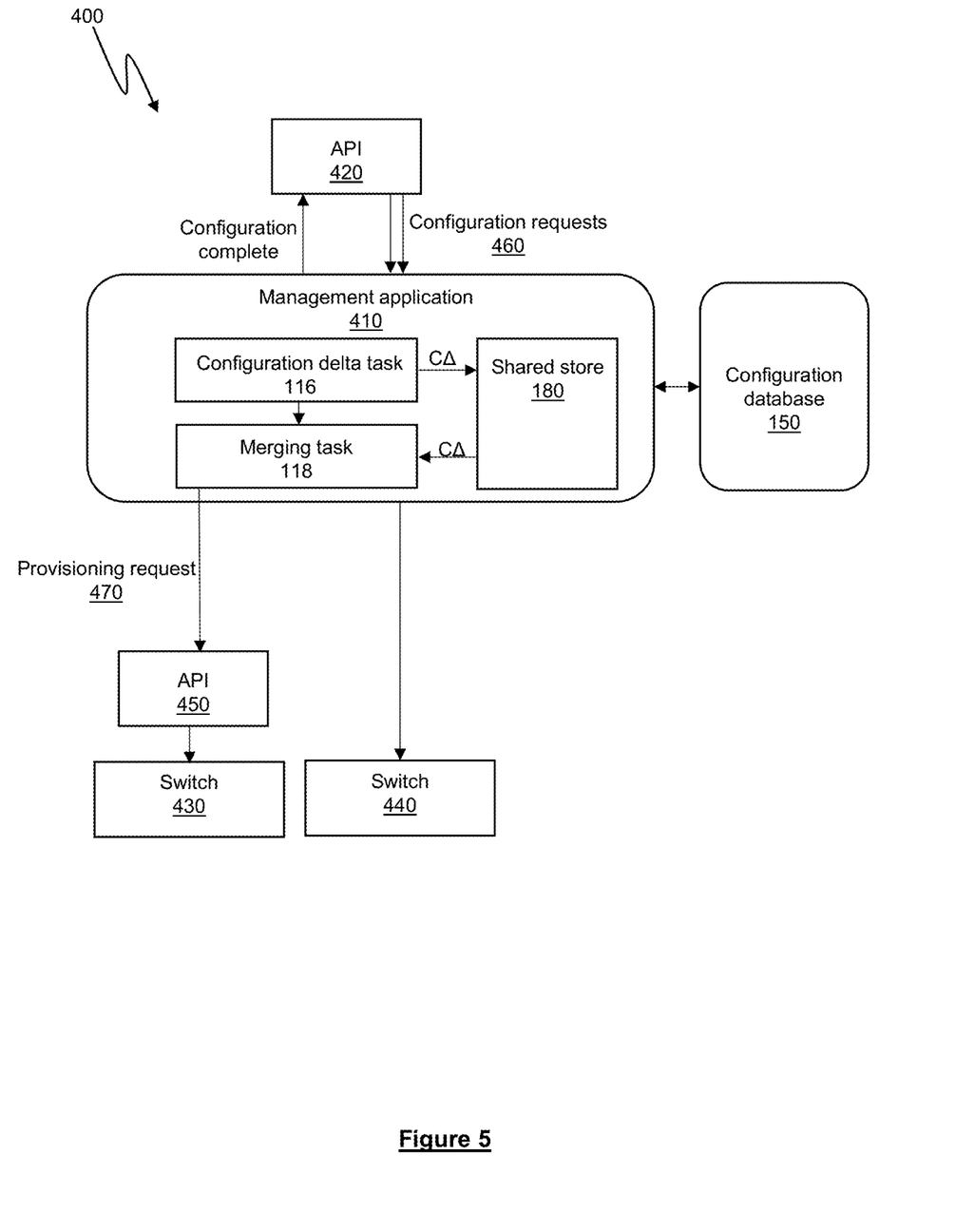
FIG. 5 illustrates an example of managing concurrently received configuration requests in a computing network.

FIG. 5 schematically illustrates the use of a computing system of the kind described above with reference to FIG. 1 to manage concurrently received configuration requests for native VLAN (Virtual Local Area Network) provisioning in a fabric made up of a plurality of network switches.

In the example illustrated generally at 400 in FIG. 4, a management application 410 is used to manage the provisioning and configuration of external entities in the form of network switches 430, 440 (which may be, for example layer 2/layer 3 switches) that form a composable fabric. The management application 410 includes a configuration delta task or module 116 and a merging task of module 118 of the kind described above with reference to FIG. 1. A configuration database 150 of the kind described above with reference to FIG. 1 is associated with the management application for storing configuration information.

In the illustrated example, two configuration requests 460 are received at the management application 410 via a northbound API 420 (e.g. a RESTful API of the kind that will be familiar to those of ordinary skill in the art), each configuration request 460 requesting modifications of native VLANs of a different port of the same switch, e.g. switch 430.

From the point of view of the management application 410, a native VLAN is a property of a port or link aggregate group (LAG) that can be configured in accordance with the configuration requests received via the northbound API 420. Configuration of a native VLAN can be performed on creation of a LAG, using REST POST request messages, or on modification of a LAG or port using REST PUT or PATCH request messages, via a southbound API 450 (e.g. a RESTful API) associated with one of the switches 430, 440 (e.g. switch 430 in the illustrated example) that make up the fabric.

On receiving the concurrent configuration requests 460, the management application 410 opens a separate database transaction in the configuration database 150 for each request, as described above. The requested configuration changes are recorded in the database, but are not committed at this stage.

The received configuration requests are processed by the configuration delta task or module 116 as described above in order to generate configuration deltas, each configuration delta identifying the affected port of the switch 430 being configured as a result of the received configuration requests, the port property being changed, which in this case is a native VLAN, and the new value for the property.

The merging task or module 118 retrieves a base native VLAN configuration from the configuration database 150 and modifies this base native VLAN configuration using the contents of the generated configuration deltas to generate a provisioning request 470 which includes the updated native VLAN values for both of the ports affected by the received configuration requests, along with unchanged values for the other ports of the switch. This provisioning request 470 is issued to the switch 430 via the southbound API 450 to update the native VLANs on the relevant ports in accordance with the received configuration requests. On successful completion of the provisioning request 470, the database transactions corresponding to the received configuration requests are committed, and the configuration requests 460 received via the northbound API 420 are also completed with "good" status. However, if the provisioning request 470 is not successfully completed (after a number of retries of some or all configuration deltas) the database transactions are rolled back, reverting the configuration database 150 and the management application 410 to the state in which they existed prior to the database transactions being opened, and the received configuration requests 460 are completed with appropriate error codes.

As will be apparent from the foregoing description and the accompanying Figures, the system and method of the present disclosure, in particular the generation of configuration deltas from multiple concurrently received configuration requests and the merging of configuration deltas derived from the multiple concurrently received configuration requests into provisioning requests, provides a mechanism for managing multiple concurrently received configuration requests efficiently. In particular changes to the configuration of one or more external entities that have been requested in multiple different configuration requests can be provisioned on those external entities simultaneously, using "merged" provisioning requests. This approach can reduce latency in the handling of multiple concurrent configuration requests. Further, this approach may ensure that changes made in the context of one transaction cannot overwrite changes made in the context of another transaction, because transactions are not committed until successful completion of the generated provisioning request. Additionally, this approach may ensure that the current provisioning state of an external entity is accurately reflected in the configuration database. Examples of the present disclosure also maintain the ability to roll back to a previous configuration in the event of failure of the provisioning request.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality. Any reference signs in the claims shall not be construed so as to limit their scope.

The invention claimed is:

1. A method for managing concurrent configuration requests in a computing network that includes a set of configurable network entities, the method comprising:
receiving a plurality of configuration requests concurrently, each of the plurality of configuration requests relating to a first network entity of the computing network;

opening a separate database transaction in a configuration database for each received configuration request;
obtaining an existing configuration of the first network entity from the configuration database;
identifying a plurality of configuration deltas based on the received plurality of configuration requests and the obtained existing configuration, each of the plurality of configuration deltas representing a change in the existing configuration of the first network entity requested by one of the plurality of received configuration requests;
modifying the existing configuration of the first network entity using the plurality of identified configuration deltas to generate a single merged provisioning request for the first network entity;
issuing the merged provisioning request to the first network entity to implement the changes in the configuration of the first network entity requested by each of the received configuration requests; and
following successful completion of the merged provisioning request by the first network entity, committing the database transaction for each received configuration request.

2. A method according to claim 1 further comprising issuing a notification that the received configuration requests have been completed following successful completion of the merged provisioning request by the first network entity.

3. A method according to claim 1 further comprising:
following failure of the merged provisioning request by the first network entity, reverting the database transaction for each received configuration request.

4. A method according to claim 1 wherein the existing configuration is a base configuration of the first network entity.

5. A method according to claim 1 wherein the existing configuration is a current configuration of the first network entity.

6. A method according to claim 3 further comprising retaining the configuration deltas in a shared store until the transaction in which the configuration deltas were generated is either committed or reverted.

7. A method according to claim 6 further comprising:
after committing a database transaction, removing the configuration deltas generated by that database transaction from the shared store.

8. A method according to claim 1, wherein identifying the plurality of configuration deltas includes:
parsing contents of each of the received plurality of configuration requests; and
comparing the parsed contents of each configuration request to the existing configuration to generate the respective configuration deltas.

9. A system for managing concurrent configuration requests in a computing network that includes a set of configurable external entities, the system comprising:
a processor; and
a machine readable medium storing instructions that when executed cause the processor to:
provide an application processing interface (API) to receive configuration requests, wherein each of a plurality of concurrently received configuration requests relate to a first external entity of the set of external entities of the computing network;
open a separate database transaction in a configuration database for each received configuration request;
obtain an existing configuration of the first external entity from the configuration database;
identify a plurality of configuration deltas based on the received plurality of configuration requests and the obtained existing configuration, each of the plurality of configuration deltas representing a change in the existing configuration of the first external entity requested by one of the plurality of received configuration requests;
modify the existing configuration of the first external entity using the plurality of identified configuration deltas to generate a single merged provisioning request for the first external entity;
issue the merged provisioning request to the first external entity to implement the changes in the configuration of the first external entity requested by each of the received configuration requests; and
following successful completion of the merged provisioning request by the first external entity, commit the database transaction for each received configuration request.

10. A system according to claim 9 wherein the instructions, when executed, further cause the processor to:
issue a notification that the received configuration requests have been completed following successful completion of the merged provisioning request by the first external entity.

11. A system according to claim 9 wherein the instructions, when executed, further cause the processor to:
following failure of the merged provisioning request by the first external entity, revert the database transaction for each received configuration request.

12. A system according to claim 9 wherein the existing configuration is a base configuration or a current configuration of the first external entity.

13. A system according to claim 9 wherein the first external entity is a network entity.

14. A system according to claim 9 wherein the instructions, when executed, further cause the processor to:
retain the configuration deltas in a shared store until the transaction in which the configuration deltas were generated is either committed or reverted; and
after committing a database transaction, remove the configuration deltas generated by that database transaction from the shared store.

15. A non-transitory computer readable storage medium having stored thereon instructions which, when executed by a processing resource, cause the processing resource to:
provide an application processing interface (API) to receive configuration requests, wherein each of a plurality of concurrently received configuration requests relate to a first network entity of a computing network;
open a separate database transaction in a configuration database for each received configuration request;
obtain an existing configuration of the first network entity from the configuration database;
identify a plurality of configuration deltas based on the received plurality of configuration requests and the obtained existing configuration, each of the plurality of configuration deltas representing a change in the existing configuration of the first network entity requested by one of the plurality of received configuration requests;
modify the existing configuration of the first network entity using the identified configuration deltas to generate a single merged provisioning request for the first network entity;
issue the merged provisioning request to the first network entity to implement the changes in configuration of the first network entity requested by each of the received configuration requests; and following successful completion of the merged provisioning request by the first network entity, committing the database transaction for each received configuration request.

16. A non-transitory computer readable storage medium according to claim 15 wherein the instructions, when executed by the processing resource, further cause the processing resource to:

issue a notification that the received configuration requests have been completed following successful completion of the merged provisioning request by the first network entity.

17. A non-transitory computer readable storage medium according to claim 15 wherein the instructions, when executed by the processing resource, further cause the processing resource to:

following failure of the merged provisioning request by the first network entity, revert the database transaction for each received configuration request.

18. A non-transitory computer readable storage medium according to claim 15 wherein the existing configuration is a base configuration or a current configuration of the first network entity.

19. A non-transitory computer readable storage medium according to claim 17 wherein the instructions, when executed by the processing resource, further cause the processing resource to:

retain the configuration deltas in a shared store until the transaction in which the configuration deltas were generated is either committed or reverted.

20. A non-transitory computer readable storage medium according to claim 19 wherein the instructions, when executed by the processing resource, further cause the processing resource to:

after committing a database transaction, remove the configuration deltas generated by that database transaction from the shared store.

* * * * *